United States Patent
Sakai et al.

(10) Patent No.: US 8,044,642 B2
(45) Date of Patent: Oct. 25, 2011

(54) POWER SUPPLY DEVICE CAPABLE OF STABLY SUPPLYING OUTPUT VOLTAGE WITH INCREASED RESPONSIVENESS

(75) Inventors: Yohichi Sakai, Toyonaka (JP); Shinichi Kojima, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 421 days.

(21) Appl. No.: 12/403,427

(22) Filed: Mar. 13, 2009

(65) Prior Publication Data

US 2009/0237055 A1    Sep. 24, 2009

(30) Foreign Application Priority Data

Mar. 18, 2008  (JP) .................................. 2008-069323

(51) Int. Cl.
*G05F 1/613* (2006.01)
(52) U.S. Cl. ........................................ 323/224; 323/351
(58) Field of Classification Search .................. 323/351, 323/224, 283, 284
See application file for complete search history.

(56) References Cited

U.S. PATENT DOCUMENTS 6,724,174 B1 * 4/2004 Esteves et al. ................ 323/224

FOREIGN PATENT DOCUMENTS

| JP | 2002-64975 | 2/2002 |
|---|---|---|
| JP | 2005-100296 | 4/2005 |
| JP | 2005-190381 | 7/2005 |
| JP | 2005-196251 | 7/2005 |
| JP | 2005-209007 | 8/2005 |
| JP | 2002-242665 | 9/2005 |
| JP | 2004-267528 | 9/2005 |
| JP | 2005-234674 | 9/2005 |
| JP | 2005-301409 | 10/2005 |
| JP | 2005-301410 | 10/2005 |
| JP | 2006-48116 | 2/2006 |
| JP | 2006-50888 | 2/2006 |
| JP | 2006-209327 | 8/2006 |
| JP | 2006-260030 | 9/2006 |
| JP | 2006-309569 | 11/2006 |
| JP | 3894833 | 12/2006 |
| JP | 2007-4591 | 1/2007 |
| JP | 2007-350668 | 2/2007 |
| JP | 2007-94540 | 4/2007 |
| JP | 2007-206948 | 8/2007 |
| JP | 4150326 | 7/2008 |
| JP | 4176002 | 8/2008 |

* cited by examiner

*Primary Examiner* — Shawn Riley
(74) *Attorney, Agent, or Firm* — Cooper & Dunham LLP

(57) ABSTRACT

In a power supply device, a synchronous rectifier step-down converter alternately turns on and off a switch and a synchronous rectifier switch. A reference voltage generator generates a predetermined reference voltage. An error amplifier outputs an error voltage such that an output voltage of the step-down converter approaches the predetermined reference voltage. A pulse-width signal generator generates a pulse-width signal controlling turning on and off the switch and the synchronous rectifier switch based on the error voltage. A driver circuit controls turning on and off the switch and the synchronous rectifier switch based on the pulse-width signal. An inductor is connected in series with output of the step-down converter. A bypass switch short-circuits an output terminal of the step-down converter to an input terminal of the step-down converter. A mode controller controls turning on and off the bypass switch.

5 Claims, 3 Drawing Sheets

US 8,044,642 B2

POWER SUPPLY DEVICE CAPABLE OF STABLY SUPPLYING OUTPUT VOLTAGE WITH INCREASED RESPONSIVENESS

BACKGROUND

1. Technical Field

The present specification describes a power supply device, and more particularly, a power supply device using a synchronous rectifier step-down converter.

2. Discussion of the Background

A source voltage required by a power amplifier used for a cell phone or the like depends on output power of the power amplifier, and ranges from about 0.6 V to about 3.5 V.

For example, when a power amplifier requires a source voltage of 1 V, if a battery voltage of about 3.5 V is used, the power amplifier consumes more electrical power than necessary. Therefore, in order to supply a circuit driven at a voltage smaller than the battery voltage with a source voltage smaller than the battery voltage, conventional power supply devices use a step-down DC-DC converter such as a switching regulator.

However, such DC-DC converters themselves consume power due to their use of inductor and switching elements. Therefore, when the power supply device does not need to step down a battery voltage as an input voltage, the power supply device stops operation of the switching regulator and outputs the input voltage as is by bypassing the step-down DC-DC converter using a bypass circuit.

However, once the source voltage outputs the input voltage by using the bypass circuit bypassing the step-down DC-DC converter, when the power supply device resumes step-down operation of the step-down DC-DC converter, switching operation resumes in a state in which there is a high voltage across an output terminal of the step-down DC-DC converter. As a result, a synchronous rectifier switch is rapidly turned on, resulting in overshoot and ringing, making the output voltage unstable.

In order to address that problem, one related-art power supply device includes a synchronous rectifier step-down converter, a voltage generator, a regulator, and a pulse-width modulator. The synchronous rectifier step-down converter alternately turns on and off a switch and a synchronous rectifier switch. The voltage generator outputs a voltage greater than that of the step-down converter. The regulator outputs an error voltage such that an output voltage of the step-down converter approaches a predetermined reference voltage. The power supply device chooses either the step-down converter or the voltage generator to output a desired voltage. When the voltage generator is chosen, the regulator offsets the error voltage such that the synchronous rectifier switch is turned off.

Since the error voltage of the regulator is offset when an output voltage of the voltage generator switches to a voltage of the step-down converter, the synchronous rectifier switch starts switching operation after an off-state, thereby preventing the synchronous rectifier switch from being turned on for a long period of time. As a result, the power supply device supplies a stable output voltage with reduced overshoot.

However, since the regulator adds an offset voltage from an offset circuit to the error voltage and supplies the output to the pulse-width modulator, it takes a long time until the output voltage reaches a predetermined voltage, resulting in decreased responsiveness.

Accordingly, there is a need for a technology to provide a power supply device capable of stably generating an output voltage with increased responsiveness.

BRIEF SUMMARY

This patent specification describes a power supply device, one example of which includes a synchronous rectifier step-down converter, a reference voltage generator, an error amplifier, a pulse-width signal generator, a driver circuit, an inductor, a bypass switch, and a mode controller. The synchronous rectifier step-down converter alternately turns on and off a switch and a synchronous rectifier switch. The reference voltage generator generates a predetermined reference voltage. The error amplifier outputs an error voltage such that an output voltage of the step-down converter approaches the predetermined reference voltage. The pulse-width signal generator generates a pulse-width signal controlling timing of turning on and off the switch and the synchronous rectifier switch based on the error voltage. A driver circuit controls turning on and off the switch and the synchronous rectifier switch based on the signal generated by the pulse-width signal generator. The inductor is connected in series with output of the step-down converter. The bypass switch short-circuits an output terminal of the step-down converter to an input terminal of the step-down converter. The mode controller controls turning on and off the bypass switch. While the bypass switch is turned on, output of the error amplifier having a reference voltage that is set to a predetermined divided voltage ratio of the output voltage is inverted.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF ILLUSTRATIVE EMBODIMENTS

Figure 1:
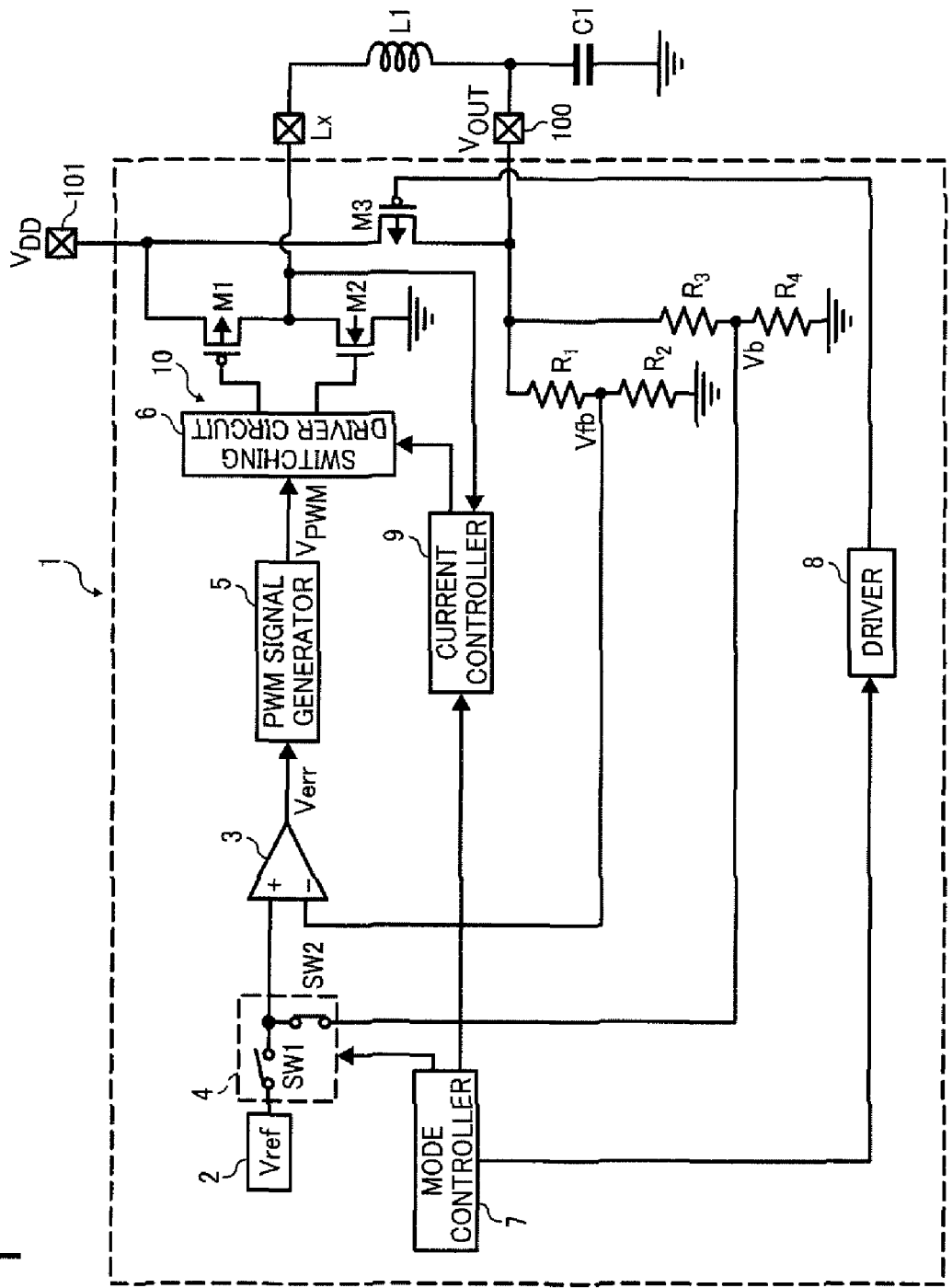
FIG. 1 is a circuit diagram of a power supply device according to an illustrative embodiment of the present disclosure.

In describing examples and embodiments illustrated in the drawings, specific terminology is employed for the sake of clarity. However, this disclosure is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, in particular to FIG. 1, a power supply device 1 according to one illustrative embodiment is explained.

FIG. 1 is a circuit diagram of the power supply device 1. The power supply device 1 includes an input terminal 101, an output terminal 100, a mode controller 7, a driver 8, a current controller 9, a step-down DC-DC converter 10, a bypass switch M3, and a junction node Lx. The step-down DC-DC converter 10 includes a switching transistor M1, a synchronous rectifier switching transistor M2, a reference voltage generator 2, resistors R1 and R2, an inductor L1, a smoothing capacitor C1, an error amplifier 3, a selection circuit 4, a PWM (pulse-width modulation) signal generator circuit 5, a switching driver circuit 6, and resistors R3 and R4. The selection circuit 4 includes switches SW1 and SW2.

The bypass switch M3 is provided in parallel with the step-down DC-DC converter 10, and functions as a voltage generator circuit. The power supply device 1 chooses either the DC-DC converter 10 or the bypass switch M3 to output a desired voltage. That is, the power supply device 1 has two operating modes. In a step-down mode, the mode controller 7 transmits a signal to the driver 8 to turn off the bypass switch M3 to cause the DC-DC converter 10 to step down an input voltage VDD and output the desired voltage. In a bypass mode, the mode controller 7 transmits a signal to the driver 8 to turn on the bypass switch M3 to cause the bypass switch M3 to output an input voltage VDD. Therefore, the power supply device 1 bypasses the DC-DC converter 10.

Since typical step-down DC-DC converters attenuate electrical power due to use of inductor and switching elements, when the power supply device 1 does not need to step down the input voltage VDD, the power supply device 1 turns off the step-down DC-DC converter 10 to bypass the step-down DC-DC converter 10, thereby outputting the input voltage VDD without stepping down the input voltage VDD. Therefore, according to this illustrative embodiment, the mode controller 7 switches between the step-down mode and the bypass mode of the power supply device 1. Thus, a voltage output by the bypass switch M3 is greater than a voltage output by the step-down DC-DC converter 10.

The step-down DC-DC converter 10 is a step-down switching regulator converting the input voltage VDD input to the input terminal 101 into a predetermined constant voltage and outputting the converted voltage from an output terminal 100 as an output voltage VOUT.

In the step-down mode, the power supply device 1 steps down the input voltage VDD and outputs the output voltage VOUT from the output terminal 100. The output voltage VOUT is controlled by a reference voltage Vref.

However, in the bypass mode, the power supply device 1 outputs the input voltage VDD regardless of the reference voltage Vref. The mode controller 7 transmits a control signal to switch between these modes.

The switching transistor M1 is a PMOS (positive channel metal oxide semiconductor) transistor and performs switching operation for output control of the input voltage VDD. The synchronous rectifier switching transistor M2 is a NMOS (negative channel metal oxide semiconductor) transistor.

The reference voltage generator 2 generates and outputs a predetermined reference voltage Vref. The resistors R1 and R2 for detecting an output voltage divide an output voltage VOUT to generate a divided voltage Vfb and output the voltage Vfb to the error amplifier 3. Then, the error amplifier 3 amplifies a voltage difference between the divided voltage Vfb and the reference voltage Vref to generate an error voltage Verr. The step-down DC-DC converter 10 adjusts the error voltage Verr by feedback such that the output voltage VOUT and the reference voltage Vref satisfy a relation of VOUT=Vref×(R1+R2)/R2.

Figure 2:
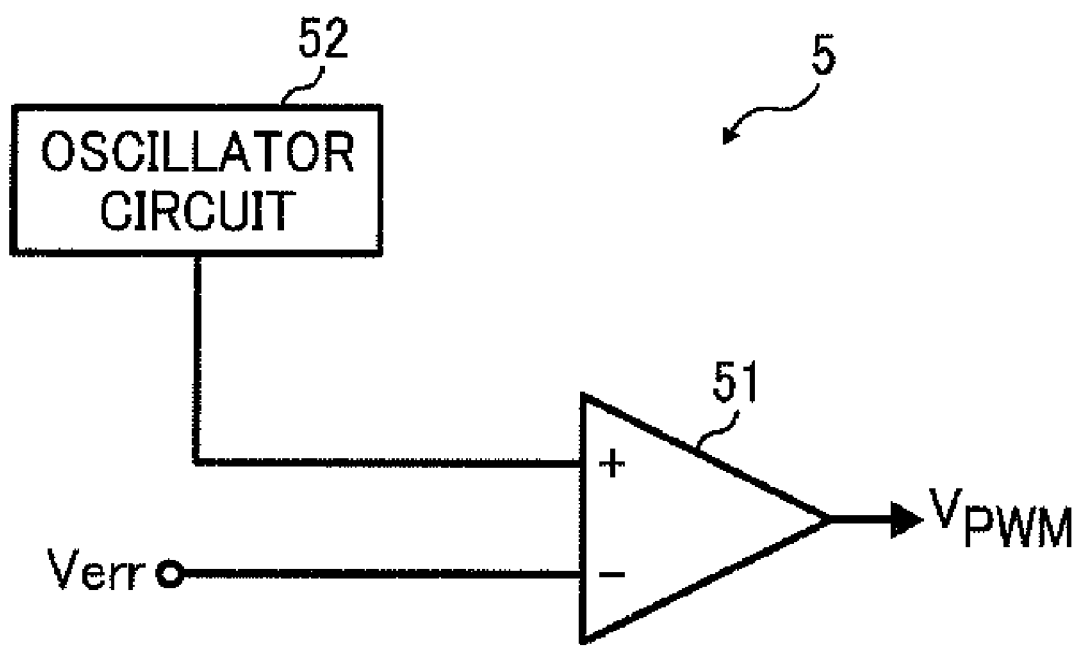
FIG. 2 is a circuit diagram of a PWM signal generator included in the power supply device shown in FIG. 1.

Referring to FIG. 2, a description is now given of the PWM signal generator 5. FIG. 2 is a circuit diagram of the PWM signal generator 5. The PWM signal generator 5 includes a PWM comparator 51 and an oscillator circuit 52. The error voltage Verr is input to an inverting input terminal of the PWM comparator 51, and an output of the oscillator circuit 52 is input to a non-inverting input terminal of the PWM comparator 51.

The oscillator circuit 52 generates and outputs a predetermined triangular wave signal TW. The PWM comparator 51 generates a pulse signal VPWM for performing PWM control based on the output signal Verr output from the error amplifier 3 depicted in FIG. 1 and the triangular wave signal TW.

The PWM comparator 51 compares the output voltage TW generated by the oscillator circuit 51 with the error voltage Verr. When the triangular wave signal TW is greater than the error voltage Verr, the PWM comparator 51 outputs a high-level pulse signal VPWM. When the triangular wave signal TW is smaller than the error voltage Verr, the PWM comparator 51 outputs a low-level pulse signal VPWM. That is, the pulse signal VPWM output from the PWM comparator 51 is a pulse-width modulated signal repeating a high level and a low level. It is to be noted that a duty cycle of the high-level PWM signal VPWM and the low-level PWM signal VPWM is determined by the error voltage Verr.

The step-down DC-DC converter 10 depicted in FIG. 1 is a synchronous rectifier switching regulator, and steps down (converts) the input voltage VDD input to the input terminal 101 and outputs a converted voltage to the output terminal 100. The input and output of the step-down DC-DC converter 10 are input and output of the power supply device 1.

As illustrated in FIG. 1, a source terminal of the switching transistor M1, which is a PMOS transistor, is connected to the input terminal 100, and a drain terminal of the switching transistor M1 is connected to one end of the inductor L1 via the junction node Lx. A source terminal of the synchronous rectifier switching transistor M2, which is a NMOS transistor, is grounded, and a drain terminal of the switching transistor M2 thereof is connected to the drain terminal of the switching transistor M1. Output from the switching driver circuit 6 is input to gate terminals of both the switching transistor M1 and the synchronous rectifier switching transistor M2, respectively.

The switching transistor M1 and the synchronous rectifier switching transistor M2 are connected in series between the input terminal 101 and ground GND. The resistors R1 and R2 are connected in series between the output terminal 100 and ground GND. A divided voltage Vfb is output from a junction between the resistors R1 and R2.

In the step-down mode, when the PWM signal VPWM is at a high level, the switching driver circuit 6, serving as a driver circuit, turns off the switching transistor M1 and turns on the synchronous rectifier switching transistor M2. When the PWM signal VPWM is at a low level, the switching driver circuit 6 turns on the switching transistor M1 and turns off the synchronous rectifier switching transistor M2. Therefore, the step-down DC-DC converter 10 operates as a switching regulator alternately turning on and off the switching transistors M1 and M2 based on the PWM signal to perform energy conversion using the inductor L1. The inductor L1 and the output condenser C1 form an output filter. Accordingly, a direct-current voltage converted from the input voltage VDD is output from the output terminal VOUT.

The mode controller 7 transmits a signal for switching between two modes to the switching driver circuit 6 via the current controller 9, serving as a current limiter. During the bypass mode, both the switching transistor M1 and the synchronous rectifier switching transistor M2 are turned off.

Since the PWM signal VPWM for controlling turning on and off the switching transistor M1 and the synchronous rectifier switching transistor M2 is determined based on the error voltage Verr obtained by feeding back the output voltage VOUT, the output voltage VOUT determined by the reference voltage Vref is kept constant. That is, when the output voltage VOUT decreases, the error voltage Verr of the error amplifier 3 rises to increase a width of an output pulse of the PWM signal generator 5, so that a time period in which the switching transistor M1 is turned on increases, thereby increasing the output voltage VOUT. Conversely, when the output voltage VOUT increases, operation opposite to the above operation is performed, so as to decrease the output voltage VOUT. As a result, the output voltage VOUT is kept constant.

As illustrated in FIG. 1, a control signal is input to a gate terminal of the bypass switch M3 being a NMOS transistor. A source terminal of the bypass switch M3 is connected to the input terminal 101, and a drain terminal thereof is connected to the output terminal 100. Thus, when the bypass switch M3 is turned on, the input terminal 101 and the output terminal 100 are in a conductive state, so that a voltage substantially equal to the input voltage VDD is output to the output terminal VOUT. It is to be noted that since voltage drop occurs due to on-resistance of the bypass switch M3, the output voltage output from the output terminal 100 may be slightly smaller than the input voltage VDD.

According to this illustrative embodiment, as illustrated in FIG. 1, the divided voltage Vfb is input to an inverting input terminal of the error amplifier 3, and the reference voltage Vref is input to a non-inverting input terminal of the error amplifier 3 via the selection circuit 4. The resistors R3 and R4 are connected in series between the output terminal 100 and ground GND, and a divided voltage Vb is output from a junction between the resistors R3 and R4. The divided voltage Vb is input to the non-inverting input terminal of the error amplifier 3 via the selection circuit 4.

As illustrated in FIG. 1, the reference voltage Vref generated by the reference voltage generator 2 is input to the non-inverting input terminal of the error amplifier 3 via the switch SW1. The switch SW2 is connected to a junction between the resistors R3 and R4, and the divided voltage Vb is input to the non-inverting input terminal of the error amplifier 3 via the switch SW2.

The selection circuit 4 is controlled based on the signal transmitted from the mode controller 7. When the mode controller 7 chooses the bypass switch M3 to be turned on, the switch SW1 is turned off and the switch SW2 is turned on, so that the divided voltage Vb is input to the non-inverting input terminal of the error amplifier 3 via the switch SW2.

When the mode controller 7 chooses the bypass switch M3 to be turned off, the switch SW1 is turned on and the switch SW2 is turned off, so that the reference voltage Vref generated by the reference voltage generator 2 is input to the non-inverting input terminal of the error amplifier 3 via the switch SW1.

The resisters R3 and R4 have a divided voltage ratio greater than a feedback ratio of a setting voltage of the step-down DC-DC converter 10. For example, when the resistors R1 and R2 have a divided voltage ratio of 3:1, the resistors R3 and R4 have a divided voltage ratio of 2.5:1.

Therefore, when the selection circuit 4, serving as a selector, turns the switch SW1 off and turns the switch SW2 on, the divided voltage Vfb is input to the inverting input terminal of the error amplifier 3 and the divided voltage Vb is input to the non-inverting input terminal of the error amplifier 3 via the selection circuit 4. Since the resistors R3 and R4 have a divided voltage ratio greater than a feedback ratio of a setting voltage of the step-down DC-DC converter 10, output of the error amplifier 3 is inverted. That is, when the bypass switch M3 is turned on, output of the error amplifier 3 is fixed at a high level.

When output from a junction between the switching transistor M1 and the synchronous rectifier switching transistor M2 is input to the current controller 9, the current controller 9, serving as a current limiter, measures a current flowing through the junction node Lx and limits a current flowing in a direction opposite to that of the output to the synchronous rectifier switching transistor M2. More specifically, when a value of current flowing through the junction node Lx is greater than a predetermined value, the current controller 9 transmits a signal to the switching driver circuit 6 to turn off the synchronous rectifier switching transistor M2. Although the current controller 9 has a voltage for preventing breakdown of the transistors M1 and M2, when the bypass switch M3 is selected, the current controller 9 has a voltage for preventing overshoot, and the voltage for preventing overshoot is set within a range of from about ½ to about ¼ of the voltage for preventing breakdown of the transistors M1 and M2, and set according to a discharge time of the capacitor C1. Amount of overshoot is adjusted as desired.

It is to be noted that the circuit elements of the step-down DC-DC converter 10 other than the inductor L1 and the capacitor C1 may be integrated into a single IC (integrated circuit).

Referring to FIGS. 3A to 3E, a description is now given of operation of the power supply device 1 when the step-down mode turns into the bypass mode at a certain time and then returns to the step-down mode. The scale of the time axis is exaggerated for clarity.

Figure 3A:
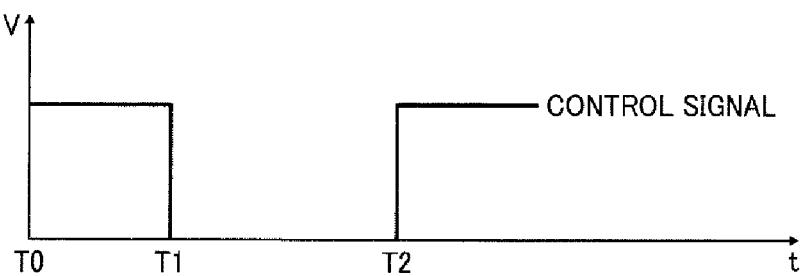
FIG. 3A is a graph illustrating a time waveform of a control signal transmitted from a mode controller circuit included in the power supply device shown in FIG. 1.

FIG. 3A is a graph illustrating a time waveform of a control signal transmitted from the mode controller 7 depicted in FIG. 1. From time T0 to T1, the control signal is high. Under this condition, the bypass switch M3 is turned off, and the power supply device 1 is activated in the step-down mode.

Figure 3B:
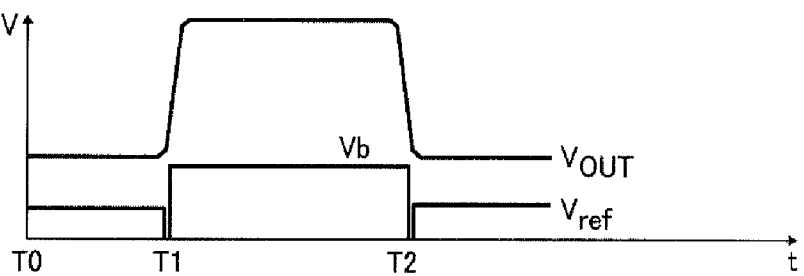
FIG. 3B is a graph illustrating time waveforms of a reference voltage Vref, an output voltage VOUT, and a divided voltage Vb.

FIG. 3B is a graph illustrating time waveforms of a reference voltage Vref, an output voltage VOUT, and a divided voltage Vb. From time T0 to T1, during the step-down mode, the reference voltage circuit 2 outputs the reference voltage Vref. In the bypass mode, the voltage Vb is output from the junction between the resistors R3 and R4 having a divided voltage ratio greater than a feedback ratio of a setting voltage of the step-down DC-DC converter 10.

The output voltage VOUT and the reference voltage Vref satisfy a relation of VOUT=Vref×(R1+R2)/R2. FIG. 3B illustrates an example in which the resistors R1 and R2 have a divided voltage ratio of 3:1, and the resistors R3 and R4 have a divided voltage ratio of 2.5:1.

Figure 3C:
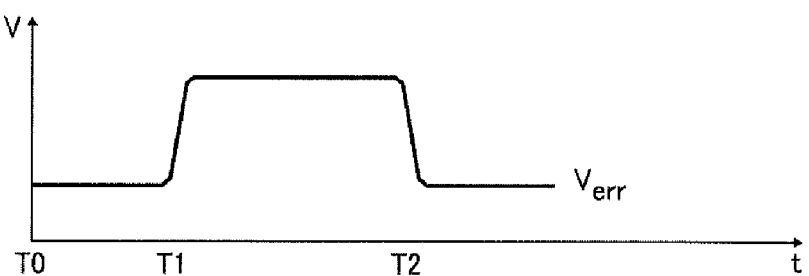
FIG. 3C is a graph illustrating a time waveform of an error voltage Verr output from an error amplifier circuit included in the power supply device shown in FIG. 1.

FIG. 3C illustrates a time waveform of the error voltage Verr output from the error amplifier 3 depicted in FIG. 1. From time T0 to T1, the error voltage Verr is maintained substantially constant, so as to satisfy the relation of VOUT=Vref×(R1+R2)/R2.

Figure 3D:
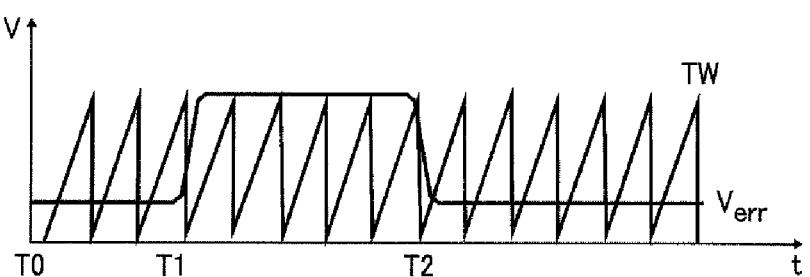
FIG. 3D is a graph illustrating time waveforms of the error voltage Verr and a triangular wave signal TW output from an oscillator circuit included in the PWM signal generator shown in FIG. 2.
Figure 3E:
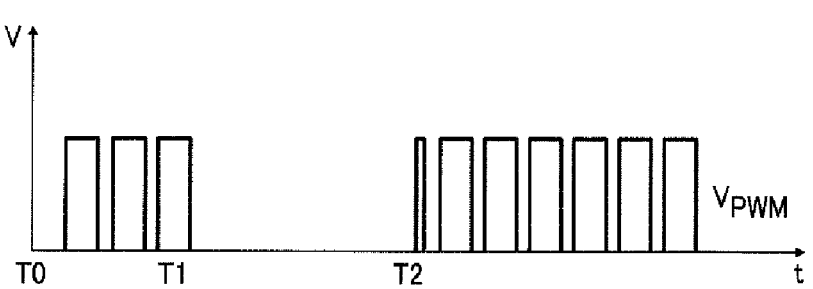
FIG. 3E is a graph illustrating a waveform of a PWM signal VPWM output from the PWM signal generator shown in FIG. 2.

FIG. 3D illustrates time waveforms of the error voltage Verr and the triangular wave signal TW generated by the oscillator circuit 52 depicted in FIG. 2. FIG. 3E illustrates a waveform of the PWM signal VPWM output from the PWM signal generator 5 depicted in FIG. 1. The waveform of the PWM signal VPWM depicted in FIG. 3E is determined based on the error voltage Verr and the triangular wave signal TW.

As illustrated in FIG. 3A, when the control signal becomes low at time T1, the bypass switch M3 is turned on to shift to the bypass mode. Simultaneously, based on the control signal, the switching driver circuit 6 turns off both the switching transistor M1 and the synchronous rectifier switching transistor M2. In addition, the control signal is input to the selection circuit 4 to turn the switch SW1 off and turn the switch SW2 on, and the divided voltage Vb is input to the inverting input terminal of the error amplifier 3.

When the bypass switch M3 is turned on, as illustrated in FIG. 3B, the output voltage VOUT of the power supply device 1 increases up to a voltage substantially equal to the input voltage VDD. The divided voltage Vb greater than a feedback ratio of a setting voltage of the step-down DC-DC converter 10 is input as a reference voltage to the inverting input terminal of the error amplifier 3.

From time T1 to T2, the divided voltage Vfb is input to the inverting input terminal of the error amplifier 3, and the divided voltage Vb is input to the non-inverting input terminal of the error amplifier 3 via the selection circuit 4. Since the resistors R3 and R4 have a divided voltage ratio greater than a feedback ratio of a setting voltage of the step-down DC-DC converter 10, the output of the error amplifier 3 is inverted. That is, from time T1 to time T2 when the bypass switch M3 is selected, the output voltage Verr of the error amplifier 3 is fixed at a high level. Therefore, from time T1 to T2, the PWM signal VPWM is low, as illustrated in FIG. 3E.

At time T2, when the control signal is again high, the bypass switch M3 is turned off to return to the step-down mode. When the control signal is high, the switching driver circuit 6 resumes switching operation of the switching transistor M1 and the synchronous rectifier switching transistor M2 based on the PWM signal VPWM. The divided voltage Vfb is input to the inverting input terminal of the error amplifier 3, and the reference voltage Vref generated by the reference voltage generator 2 is input to the non-inverting input terminal of the error amplifier 3 via the selection circuit 4.

Since the PWM signal VPWM is low at time T2, as illustrated in FIG. 3E, when the driver circuit 6 resumes switching operation of the switching transistor M1 and the synchronous rectifier switching transistor M2, the synchronous rectifier switching transistor M2 resumes operation after being in an off-state. Thereafter, as illustrated in FIG. 3D, since the output Verr of the error amplifier 3 is high, the duty cycle of the PWM signal VPWM responsively increases to turn on the synchronous rectifier switching transistor M2, thereby stably outputting the output voltage VOUT.

According to the illustrative embodiment, when the power supply device 1 is activated in the bypass mode, the error amplifier 3 is fixed at a high level. As a result, when the power supply device 1 shifts to the step-down mode, since the synchronous rectifier switching transistor M2 resumes operation after being in an off-state, there is no excessive discharge of the charge stored in the capacitor C1, thereby preventing overshoot of the output voltage VOUT. In addition, since the error amplifier 3 is fixed at a high level, the duty cycle of the PWM signal VPWM responsively increases, so that the synchronous rectifier switching transistor M2 is turned on, thereby stably outputting the output voltage VOUT.

It is to be noted that in taking overshoot into account, the current controller 9 controls timing of turning off the synchronous rectifier switching transistor M2 based on a current value of the output voltage VOUT.

The power supply device 1 depicted in FIG. 1 is useful for a data terminal powered by battery power, for example, a cell phone, PDA (Personal Digital Assistant), and the like.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese Patent Application No. 2008-069323 filed on Mar. 18, 2008 in the Japan Patent Office, the entire contents of which are hereby incorporated herein by reference.

What is claimed is:

1. A power supply device comprising:
a synchronous rectifier step-down converter to alternately turn on and off a switch and a synchronous rectifier switch;
a reference voltage generator to generate a predetermined reference voltage;
an error amplifier to output an error voltage such that an output voltage of the step-down converter approaches the predetermined reference voltage;
a pulse-width signal generator to generate a pulse-width signal controlling timing of turning on and off the switch and the synchronous rectifier switch based on the error voltage;
a driver circuit to control turning on and off the switch and the synchronous rectifier switch based on the signal generated by the pulse-width signal generator;
an inductor connected in series with output of the step-down converter;
a bypass switch to short-circuit an output terminal of the step-down converter to an input terminal of the step-down converter; and
a mode controller to control turning on and off the bypass switch,
wherein, while the bypass switch is turned on, output of the error amplifier having a reference voltage value that is set to a predetermined divided voltage ratio of the output voltage is inverted.

2. The power supply device according to claim 1, wherein the predetermined divided voltage ratio is greater than a feedback ratio of a setting voltage of the step-down converter.

3. The power supply device according to claim 1, further comprising:
a selector to select either output divided from the output of the step-down converter at the predetermined divided voltage ratio or output from the reference voltage generator to be input to a reference voltage input terminal of the error amplifier.

4. The power supply device according to claim 1, further comprising:
a current limiter to limit a current flowing in a direction opposite to that of output of the synchronous rectifier switch.

5. The power supply device according to claim 4, wherein the current limiter switches a current limiting value for a predetermined time period in which the mode controller chooses whether to use the step-down converter or the bypass switch.

* * * * *